United States Patent
Wu et al.

(10) Patent No.: US 10,721,377 B1
(45) Date of Patent: Jul. 21, 2020

(54) PRODUCTION-AS-A-SERVICE SYSTEMS FOR MAKING MOVIES, TV SHOWS AND MULTIMEDIA CONTENTS

(71) Applicant: WeMovie Technologies, San Ramon, CA (US)

(72) Inventors: Xidong Wu, San Ramon, CA (US); Xiubo Wu, Beijing (CN)

(73) Assignee: WeMovie Technologies, San Ramon, CA (US)

( * ) Notice: Subject to any disclaimer, the term of this patent is extended or adjusted under 35 U.S.C. 154(b) by 0 days.

(21) Appl. No.: 16/516,690

(22) Filed: Jul. 19, 2019

Related U.S. Application Data

(63) Continuation of application No. PCT/CN2019/090722, filed on Jun. 11, 2019.

(51) Int. Cl.
  *H04N 5/222* (2006.01)
  *G11B 27/031* (2006.01)
  (Continued)

(52) U.S. Cl.
  CPC ......... *H04N 5/2228* (2013.01); *G11B 27/031* (2013.01); *H04N 5/23203* (2013.01); *H04N 21/262* (2013.01); *H04N 21/854* (2013.01)

(58) Field of Classification Search
  CPC ............. H04N 5/2228; H04N 5/23203; H04N 21/262; H04N 21/854
  See application file for complete search history.

(56) References Cited

U.S. PATENT DOCUMENTS

| | | | |
|---|---|---|---|
| 6,466,655 B1 | 10/2002 | Clark | |
| 9,106,812 B1 * | 8/2015 | Price | G06F 16/40 |

(Continued)

FOREIGN PATENT DOCUMENTS

| | | |
|---|---|---|
| CN | 101316362 A | 12/2008 |
| CN | 108447129 A | 8/2018 |
| JP | 2000101647 A | 4/2000 |

OTHER PUBLICATIONS

International Search Report and Written Opinion dated Mar. 10, 2020 in International Application No. PCT/CN2019/090722, 10 pages.

*Primary Examiner* — Jeremiah C Hallenbeck-Huber
(74) *Attorney, Agent, or Firm* — Perkins Coie LLP

(57) ABSTRACT

Methods, apparatus and systems related to production of a movie, a TV show or a multimedia content are described. In one example aspect, a system for producing a movie includes a pre-production subsystem configured to receive information about a storyline, cameras, cast, and other assets for the movie from a user. The pre-production subsystem is configured to generate one or more machine-readable scripts corresponding to one or more scenes. The system includes a production subsystem configured to receive the scripts from the pre-production system to determine constraints among the scenes. The production subsystem is further configured to determine actions for the cameras and the cast for obtaining footages according to the storyline. The system includes a device management subsystem configured to control the cameras and the cast based on the determined actions by the production system and a post-production editing system configured to receive the footages from the production subsystem for performing video and audio editing.

29 Claims, 8 Drawing Sheets

(51) Int. Cl.
*H04N 21/262* (2011.01)
*H04N 21/854* (2011.01)
*H04N 5/232* (2006.01)

(56) References Cited

U.S. PATENT DOCUMENTS

| | | |
|---|---|---|
| 2002/0099577 A1 | 7/2002 | Black |
| 2006/0053041 A1* | 3/2006 | Sakai ............... G05B 15/02 705/7.36 |
| 2008/0028318 A1* | 1/2008 | Shikuma ............ G11B 27/034 715/744 |
| 2013/0151970 A1 | 6/2013 | Achour |
| 2013/0232178 A1* | 9/2013 | Katsambas ............ G06F 16/13 707/825 |
| 2013/0290557 A1* | 10/2013 | Baratz ................ H04L 65/60 709/231 |
| 2014/0132841 A1* | 5/2014 | Beaulieu-Jones ........................... H04N 21/47815 348/722 |
| 2014/0133834 A1* | 5/2014 | Shannon ................. H04N 9/80 386/278 |
| 2015/0012325 A1* | 1/2015 | Maher ............. G06Q 10/06313 705/7.23 |
| 2015/0281710 A1* | 10/2015 | Sievert ................ H04N 19/164 375/240.02 |
| 2015/0363718 A1* | 12/2015 | Boss ................. G06Q 10/0633 705/7.27 |
| 2016/0132546 A1* | 5/2016 | Keating ............... G06F 16/211 707/737 |
| 2017/0337912 A1* | 11/2017 | Caligor ................. H04N 5/765 |
| 2019/0155829 A1 | 5/2019 | Schriber et al. |
| 2019/0215540 A1* | 7/2019 | Nicol .................. H04N 21/233 |

* cited by examiner

PRODUCTION-AS-A-SERVICE SYSTEMS FOR MAKING MOVIES, TV SHOWS AND MULTIMEDIA CONTENTS

PRIORITY CLAIM AND RELATED APPLICATION

Under 35 U.S.C. § 120, this application is a continuation of and claims priority to International Patent Application No. PCT/CN19/90722 of the same title and the same content, filed on Jun. 11, 2019. The entire content of the before-mentioned patent application is incorporated by reference as part of the disclosure of this application.

TECHNICAL FIELD

This patent document relates to production of motion pictures, videos, movies or multimedia products including moving images and associated online distribution or streaming services.

BACKGROUND

Making a movie or TV show is a labor-intensive and financially costly process. For example, the entire production process of a movie may take more than a year and requires collaboration from a large crew. The complex and prolonged movie production process drives up the production cost. For example, the production cost for a feature film today can range from tens of millions of dollars to hundreds of millions of dollars. TV production may be less expensive than most movie productions but still requires substantial costs. The labor-intensive nature and the high costs of movie and TV program production are barriers to many contents to be offered to consumers and have continued to exist in the era of the increasingly digitization of various processes and progresses in cloud technologies in the movie and TV production and distribution. The commercial success of a movie or TV show tends to be affected by many factors and thus may have significant risks. For example, piracy is a significant risk to movie and TV show production worldwide. Content leaks prior to scheduled releases can lead to devastating financial results or even impact the storyline, especially for a TV series.

With the advancements in network communication and digital editing, content publishing becomes increasingly popular. Nowadays, making and sharing a video clip can be done at a relatively low cost and with ease via computer and communications networks. Movie and TV productions, however, remain a complicated and costly undertaking for a range of movie and video production projects including some low-budget movie and video projects.

SUMMARY

Described herein are techniques, subsystems and systems for providing cloud-based production services for making movies and videos, including end-to-end or full-service movie production cloud services from a story to final movie content delivery. The disclosed techniques and systems can be used in various embodiments to reduce the complexity, time, and cost in pre-production planning, production, and post-production editing via digital analytics and digital intelligence, thereby allowing highly efficient production or creation of content, including near real-time distribution of the content such as real-time movie broadcasting. Due to the cloud and automated nature of the disclosed techniques and systems, users do not need to master sophisticated computing hardware or software knowledge. Non-professionals are thus able to produce movies without being deeply involved in the technical aspects of movie productions.

DETAILED DESCRIPTION

Movie and TV program production is a complex process involving many components and operations and tends to be labor intensive and costly. The examples of various production techniques and systems disclosed in this patent document can be used to leverage computing technologies via computer processors, computer servers and computer storages that are networked in one or more communication networks or systems to provide cloud-based movie production services to users or entities in a distributed manner. In some aspects, implementations of disclosed production techniques and systems in this patent document may provide cloud-based service features similar to a software as a service (SaaS) and may therefore be referred to as Movie Production As A Service (MPaaS). The following sections use the movie production as an example and many disclosed features are applicable to TV program production and production of other multimedia with digital moving images.

Figure 1:
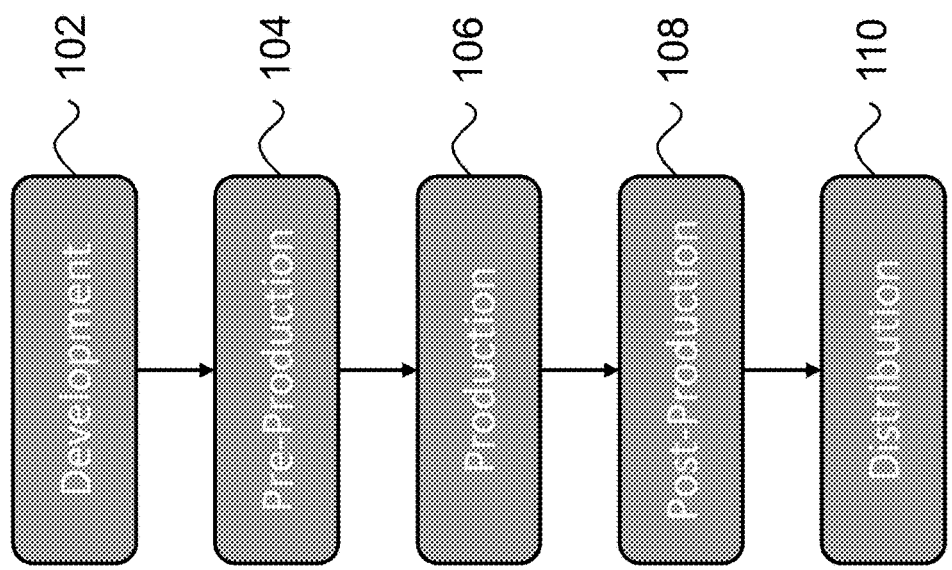
FIG. 1 illustrates various stages in a movie production process.

FIG. 1 illustrates various stages in a movie production process. A movie production project starts with the development stage 102, in which a script is developed based on an idea, a story, a book, or an existing script. The pre-production stage 104 focuses heavily on planning. This is the stage in which the budget is determined, the preliminary production schedule is set, and the cast is selected. At the end of pre-production stage, a detailed movie script is produced and can be relied upon by all later stages in the production process. The production stage 106 starts after the cast is hired and all the assets (equipment, materials, etc.) are secured. During this stage, it is important to keep planning ahead of the shoot so that the principal photography can go as smoothly and efficiently as possible. The post-production stage 108 typically starts after the production stage 106 finishes, but these two stages may overlap. Typical post-production tasks include editing, digitizing the footage, compression, and/or color correction. In various movie productions today, digital video cameras and digital sound recording devices are used to capture all the images and sound in digital form for post-production editing. The completed film is digital (including one or more digital files) and is distributed in the distribution stage 110 to the audience.

More often than not, a movie script contains scenes at different geographically locations. Each scene contains multiple shots in sequence and each shot needs multiple cameras that need to be synchronized. To coordinate many cameras from one scene/shot to another or from one location to another can be chaotic. Furthermore, in post-production stage, advanced editing techniques increase the difficulty of computerized processing as many advanced editing techniques requires subtle scene changes that are adapted to human perception.

This patent document includes techniques and systems that can be implemented in various embodiments to automate the whole or a portion of the production process in FIG. 1 via cloud computing and services. Implementations of the techniques and systems disclosed in this patent document can be used to reduce the human labor in movie production, to improve efficiency by standardizing certain aspects of movie production and keep the budget and timeline in control. The disclosed techniques and systems provide a distributed platform and services for non-professionals to produce low budget movie and TV content with minimal expertise, tools, equipment and software as compared to traditional productions. The system also makes broadcasting real time movie possible. While the disclosed techniques and systems can enable movie production with reduced human intervention, user interfaces are provided to incorporate artistic inputs from the directors and editors in various stages to facilitate and enhance artistic innovations and creative contributions and to provide flexibility to people involved in movie production.

Figure 2:
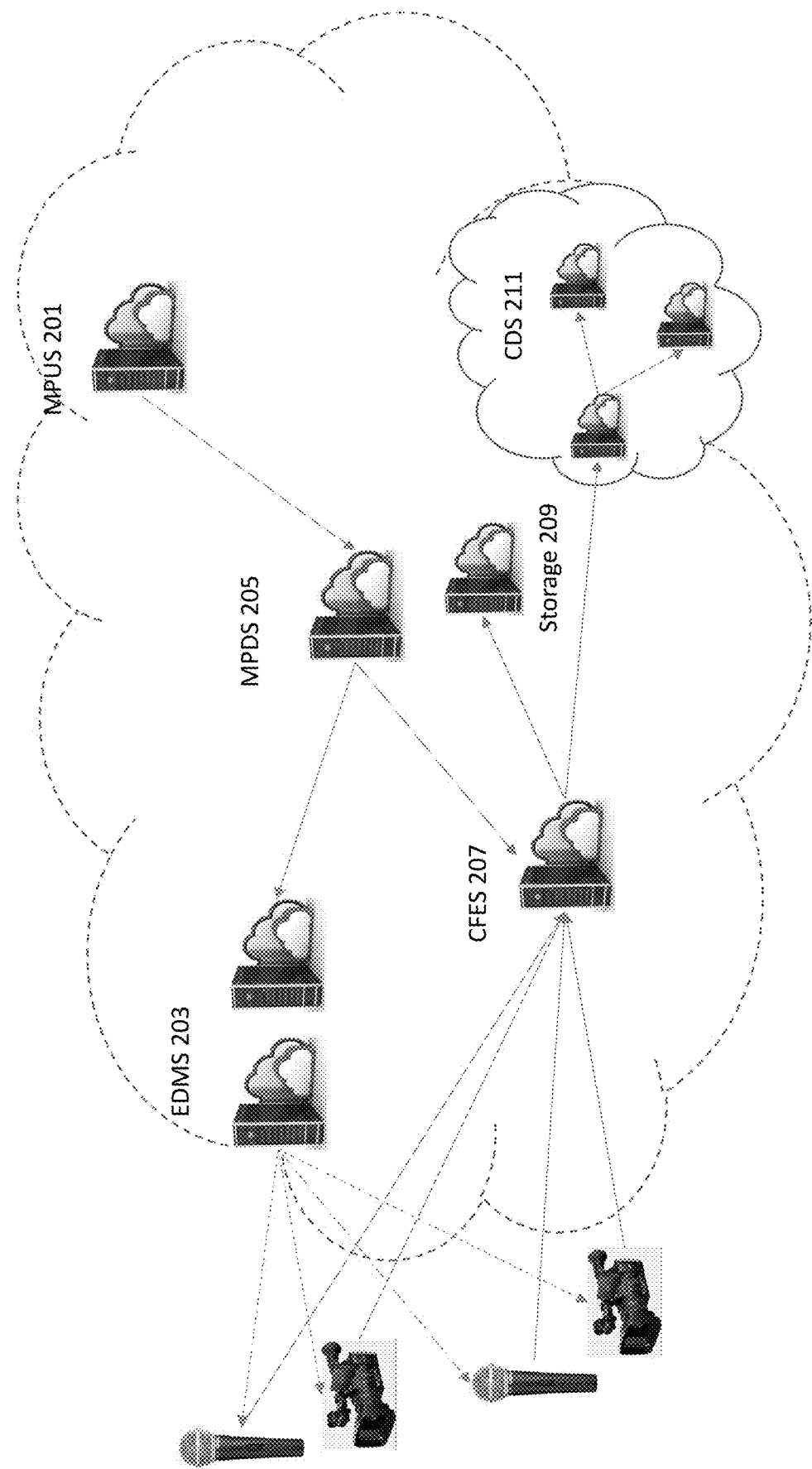
FIG. 2 illustrates an example architecture of a movie production system in accordance with one or more embodiments of the present technology.

FIG. 2 illustrates an example architecture of a movie production system 200 in accordance with one or more embodiments of the present technology. The movie production system example 200 includes four main sub-systems: Movie Pre-production User Service (MPUS) 201, End Devices Management System (EDMS) 203, Movie Production Directing System (MPDS) 205, and Cloud-based Film Editing System (CFES) 207. The movie production system 200 can include digital storage in the main sub-systems for storing digital data for the movie production and may also include additional storage 209 to store movie data. The system 200 can further include a Content Delivery System (CDS) 211 to provide real-time or quasi-real-time distribution of the content. In some implementations, the movie production system 200 may be offered as a full system to a user as a complete system for production of a movie or TV show; while in other implementations, one or more of the sub-systems in the system 200 may be accessed by a user to facilitate part of a particular production of a movie or a TV show.

The examples of some of the technical details of the sub-systems and components are further discussed in detail below.

Movie Pre-Production User Service (MPUS) System

One important aspect of the pre-production stage is planning of the movie production including operations that define the full scope of the work. Possible points of failure are also identified and addressed, otherwise the subsequent stages in the production process can quickly go out of control. The MPUS provides a web-based user interface that guides users to work through the pre-production process. Based on the genre or visual style of the film, the MPUS can generate machine-readable scripts for the scenes and determine a preliminary production schedule for the user.

Figure 3:
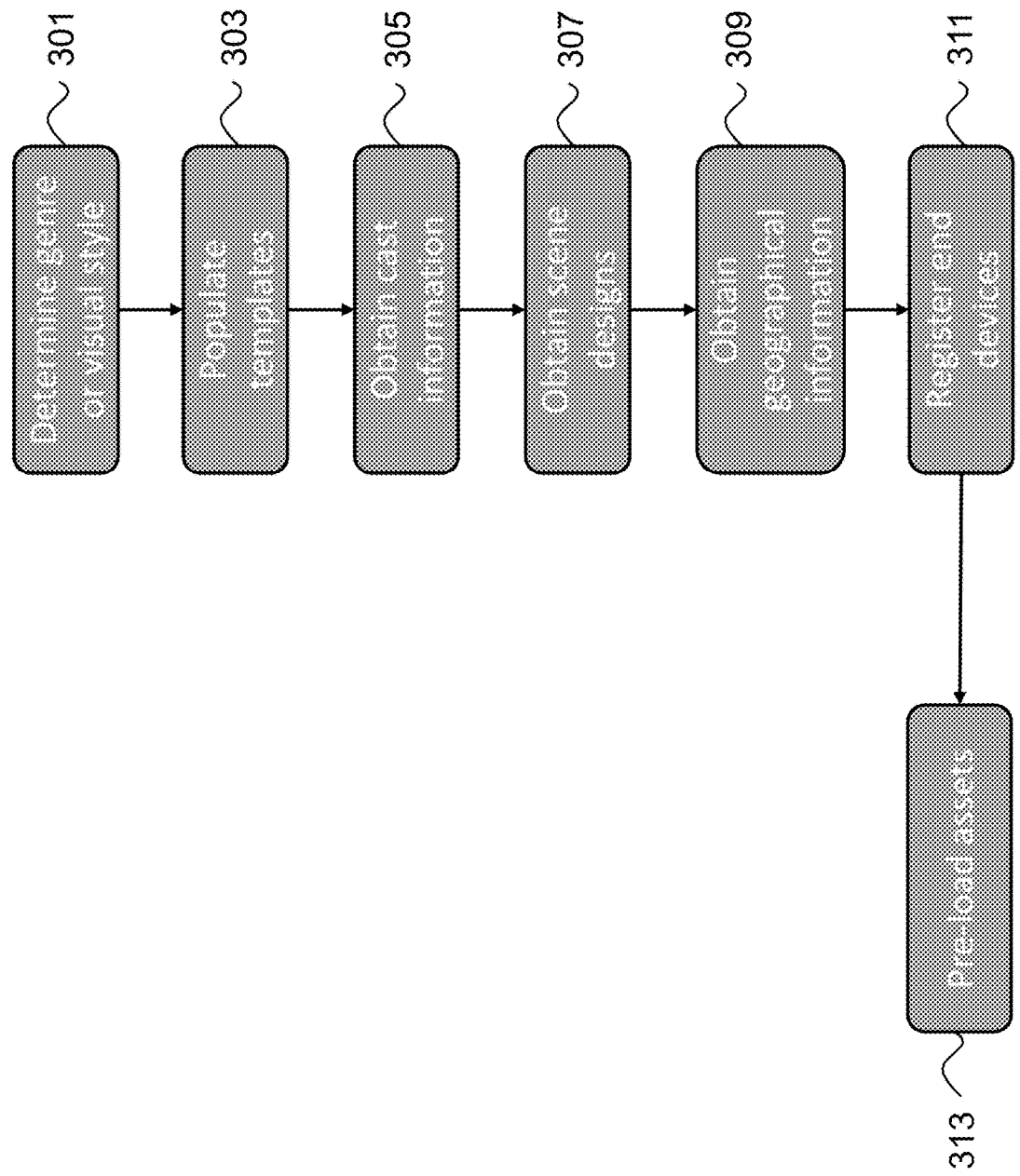
FIG. 3 is a flowchart representation of an example pre-production process using the MPUS in accordance with the present technology.

FIG. 3 is a flowchart representation of an example pre-production process using the MPUS in accordance with the present technology.

In operation 301, a genre (Comedy, Romance, Action, Drama, Horror, Documentary, etc.) or a visual style is determined based on the storyline developed in the development stage. The MPUS can determine the genre or the visual style automatically by analyzing the story (e.g., given a traditional movie script). Alternatively, the user can specify the genre of the production manually via the web-based interface.

In operation 303, the MPUS can pre-populate several templates for integrated segments or scenes that collectively to develop and to present the storyline. In some embodiments, the MPUS can provide 10 to 20 templates for each genre. The user can select a desired template to modify or can create a new template for future uses. The templates allow the user to focus on the specific requirements for each production project instead of being forced to consider all aspects in pre-production planning.

In operation 305, the user provides roles, actors, and also other cast information to the MPUS via the user interface of the MPUS.

In operation 307, the user designs scenes for the storyline under the selected template(s). In some embodiments, the MPUS can provide template scenes automatically. The user can use the template scenes directly or make necessary or desired adjustments as the user sees fit.

In operation 309, the user provides geographical locations of the scenes to MPUS. In some embodiments, the MPUS can also make suggestions regarding the scene locations based on the storyline.

In operation 311, the user registers user devices for the production, including cameras, audio devices, as well as other storage or network devices. The MPUS includes the device information when generating the scripts, thereby allowing the MPDS and EDMS to control the devices in subsequent stages.

In operation 313, the user can pre-load a subset of movie assets, such as music, background videos, or commercial clips. Information regarding the assets are also included in the scripts generated by the MPUS to allow the CFES to perform editing using the assets.

Based on the information obtained in the above operations, the MPUS can generate one or more machine-readable scripts to be used for the production stage. Such machine-readable scripts can be described in different languages, including but not limited to the eXtensible Markup Language (XML) and/or JavaScript Object Notation (JSON). In some embodiments, a separate language, referred to as Film Directing Markup Language (FDML), can be designed to accommodate particular requirements of movie productions. Table 1 illustrates an example of a machine-readable script in FDML in accordance with an embodiment of the present technology.

TABLE 1

An example of machine-readable script in FDML

{
  "Title":"Forrest Gump",
  "Production Year": 1995,
  "Script Writer": "Eric Roth",
  "Director": "Robert Zee Zemeckis", TABLE 1-continued An example of machine-readable script in FDML

```
"Actors": [
    {"Actor Name": "Tom Hanks", "Sex": "M"," Role": "Leading actor","Role Name": "Forrest"},
    {"Actor Name": "Robin Wright", "Sex": "F", "Role": "Leading actress", "Role Name": "Jenny"}
],
"Cameras": [
    {"ID": "C1", "Model": "SONY T100", "Serial Number": "M12345"},
    {"ID": "C2", "Model": "SONY T100", "Serial Number": "M23456"},
    {"ID": "C3", "Model": "SONY T100", "Serial Number": "M34567"},
]
"Scenes": [
    {
        "ID": 1,
        "Starting time": 0,
        "Duration": 180,
        "Name": "Forest Bullied",
        "Location": "Jogging Trail",
        "GPS Locations": {"Lat: 1232435, "LON": 1212324},
        "Actors": ["Forrest", "Bully 1", "Bully 2"]
        "Shots": [
            {
                "ID": 1,
                "Actors": ["Forrest Gump", "Bully 1"],
                "Plot": "Bully1 starts chasing Forest. Forest trips.",
                "Cameras": [
                    {"Camera": "B", "Direction": "Front", "Angle": "Straight"},
                    {"Camera": "A", "Direction": "Left", "Angle": "Low"},
                    {"Camera": "C", "Direction": "Right", "Angle": "Low"}
                ],
                "StoryBoard": "sc1_sh1.gif",
                "Lines": [
                    {"By": "Forrest", "Text": "I am not afraid."},
                    {"By": "Bully 1", "Text": "I will kick your ass."},
                ],
                "Starting time": 0,
                "Duration": 100,
            },
            {
                "ID": 2,
                "Actors": ["Forrest Gump", "Bully 1", "Bully 2"],
                "Plot": "Bully2 joins chasing",
                "Cameras": [
                    {"Camera": "C1", "Direction": "Front", "Angle": "Low"},
                    {"Camera": "C2", "Direction": "Right", "Angle": "High"},
                ],
                "StoryBoard": "sc1_sh2.gif",
                "Lines": [
                    {"Cut": "C1"},
                    {"By": "Bully 1", "Text": "Come catch him."},
                    {"Cut", "C2"},
                    {"By": "Bully 2", "Text": "You can run you can't hide."},
                ],
                "Starting time": 100,
                "Duration": 80,
            }
        ]
    },
    {
        "ID": 2,
        "Starting time": 180,
        "Duration": 200,
        "Name": "Forest & Jenny on the tree",
        "Location": "Tree",
        "GPS Locations": {"Lat: 1232435, "LON": 1212324},
        "Actors": ["Forrest", "Jenny"],
        "Ads": [
            {"Type": "Drink", "Shape": "Cylinder", "Position": "Forrest hand"},
            {"Type": "Watch", "Shape": "Round", "Position": Jenny's wrist"}
        ],
        "Shots": [
            {
                "ID": 1,
                "Actors": ["Forrest Gump", "Bully 1"],
                "Plot": "Forrest & Jenny romancing.",
                "Cameras": [
                    {"Camera": "C1", "Direction": "Forrest", "Angle": "Straight"},
                    {"Camera": "C2", "Direction": "Jenny", "Angle": "Straight"},
                    {"Camera": "C3", "Direction": "Both", "Angle": "Low"},
                ],
                "StoryBoard": "sc2_sh1.gif",
                "Lines": [
                    {"By": "Forrest", "Text": "Where are you going?"},
                    {"By": "Jenny", "Text": "I am going to join a movement."},
                    {"cut": "c3"},
                    {"By": "Forrest", "Text": "When are we going to see each other again?"},
                ],
                "Starting time": 180
                "Duration": 200,
            }
        ],
    },
]
...
}
```

Figure 4A:
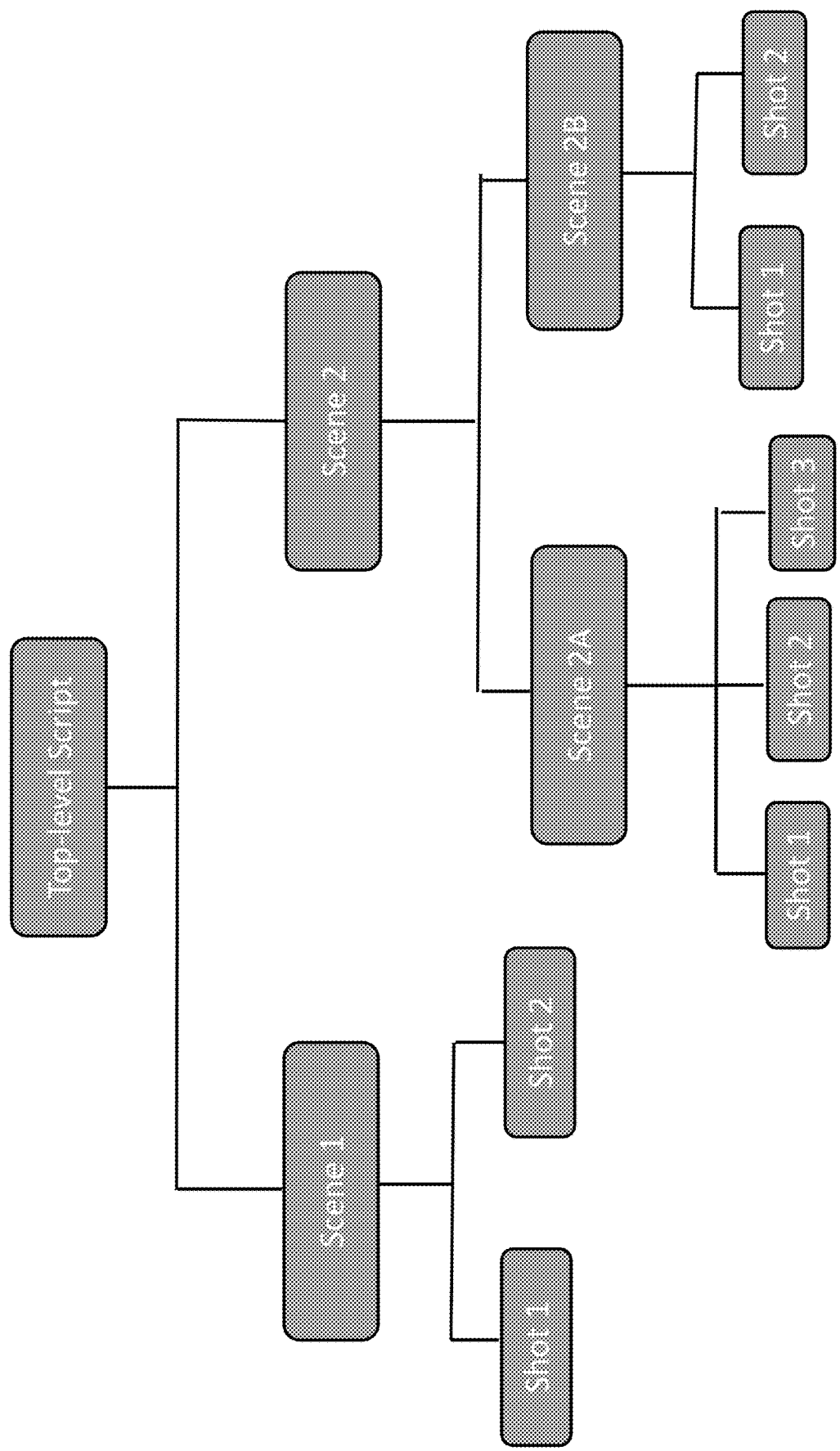
FIG. 4A illustrates an example hierarchy of scripts in accordance with the present technology.

As compared to some conventional movie scripts, the FDML script in the example above includes detailed information regarding the equipment, the cast, and the scenes. In some embodiments, the MPUS can organize such machine-readable scripts hierarchically. FIG. 4A illustrates an example hierarchy of machine-readable scripts in accordance with the present technology. The top-level script 401 includes two scenes: Scene 1 and Scene 2. Each scene can include multiple shots, e.g. shot 1 and shot 2. Alternatively, each scene can include multiple sub-scenes such as scene 2A and 2B, which further includes one or more shots.

For example, the machine-readable script shown in Table 1 can be a top-level script that provides an overall description of the assets to be used in the movie. In some embodiments, separate machine-readable scripts can be generated for each scene or shot of the movie. The structure of scripts includes some of the following important aspects:

1. The top-level machine-readable script describes all devices and personnel involved in the movie.

2. The top-level machine-readable script describes all the scenes in the movie. Each scene can have multiple sub-scenes (e.g., Scene ID 1 and Scene ID2), and each scene can have multiple shots. Note that each shot is a continuous shooting period in one location.

3. For each shot, all devices and personnel required for the shot are described.

4. In some embodiments, the script includes all the lines for the actors in each shot. The lines can be automatically extracted from the storyline or the traditional director's script. The script can also include preliminary editing information based on a quick analysis of the cameras and the lines. For example, the system can determine the correspondence between the cameras and the lines, thereby adding simple editing instructions to compose the shot. As shown in Table 1, Shot 1 of Scene can be cut at two positions, C1 and C2, before the corresponding lines by the actors. If the film editor wants to have more artistic cuts instead of relying on system's automated editing, he or she can define where and when the cut needs to be made in the script.

5. For each shot, the script can also include a preliminary start time and a duration to describe the length of the shot. The starting time can be determined based on the dependency of the scenes and/or shots. For example, the first shot of the entire movie has a start time of 0. The system can provide an estimated duration of the shot automatically or accept a user input as the estimated shot duration (e.g., 100 seconds). Shot 2 starts after shot 1, and its start time is set to be immediately after Shot 1 (e.g., 100). The duration of Shot 2 can also be estimated automatically by the system or be entered by the user.

Figure 4B:
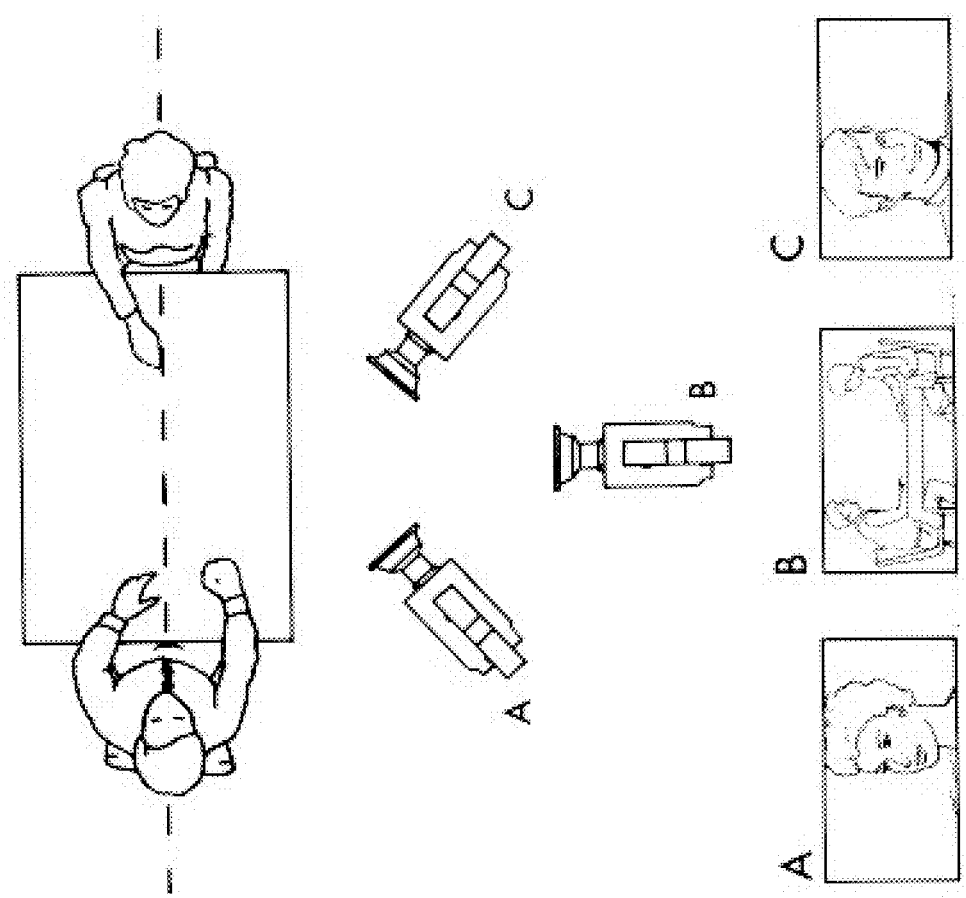
FIG. 4B illustrates an example storyboard in accordance with the present technology.

6. Each shot is associated with a storyboard. The storyboard can be generated based on information in the script, such as the number of cameras, roles, scene storyline, etc. For example, the MPUS can determine the placements and/or movements of the cameras based the conversations and/or actions in the shot. FIG. 4B illustrate an example storyboard associated with Shot 1 of Scene 1. As shown in Table 1, Shot 1 includes three cameras: A, B, and C. The script describes attributes of each of the camera, such as the direction and the angle of the camera. In some embodiments, the script further describes movement of the camera during the shot, such as the camera paths as well as angular velocity and/or speed of the cameras. In some embodiments, the MPUS can generate an associated storyboard image that depicts the content of the shot. For example, an animated image, such as a Graphics Interchange Format (GIF) image, can be used as the storyboard image to demonstrate the interactions between the actors in the shot.

7. If other assets (such as music, background videos, or commercial clips) have been preloaded into the system, the script(s) can also describe when and how the assets are to be used. For example, the script can indicate when movie commercials can be inserted into the shots. At post-production editing stage, the commercials can be placed to the scenes based on the script.

MPDS—Movie Production Directing System

MPDS sub-system serves as a role of the director in an automated MPaaS film production; it is the brain of cloud-based movie production and broadcasting system. In tradition movie production, to coordinate all equipment and personnel during film shooting can be chaotic. The same scene may have to be shot many times due to lack of coordination. The MPDS is essential for coordinating such a complex team effort to reduce or eliminate re-shooting, particularly for real-time production.

In order to enable a computer service to perform a director's work, the server needs to have the understanding of the story and the overall knowledge of equipment and personnel. The scripts generated by MPUS perfectly serve this function. After the MPUS generates the one or more scripts about the scene, the scripts are loaded into the MPDS for further processing.

Based on the geographical locations of the scenes/shots, the required equipment, and the personnel involved, the MPDS can determine dependencies and/or constraints among various scenes. For example, scenes that do not share any personnel or equipment can be shot in parallel. When two scenes have overlapped equipment and/or personnel, the MPDS can also determine the minimum time required to transfer the equipment and/or personnel, thereby imposing some constraints on the sequence of scenes. Such determinations and constraints can be communicated back to the MPUS to facilitate the generation of a preliminary schedule in order to help the user to determine budget and other factors in the entire production process.

During the production time, the MPDS can accurately determine the start time and the duration of each shot and each scene and make adjustment accordingly. For example, based on the talking speed of the actors and/or actresses, the system can adjust the preliminary duration of the shot. The start time and the duration of the subsequent shots and/or scenes can be updated accordingly. In some embodiments, the system can provide a prompt indicating a change of the total timeline and/or budget of the movie due to such adjustment. The user can choose to either shorten or lengthen some of the subsequent scenes to be consistent with the pre-production plan, or to adopt the new timeline regardless of the changes caused by the individual actors. The accurate start time and duration of each scene are also essential for editing the movie after the production stage.

Using the scripts, the MPDS can control other subsystems to perform the movie production. For example, the MPDS can instruct the EDMS system to control the equipment and personnel for each scene. In some embodiments, a large LED electronic billboard can be used to display all instructions and lines of the shot to the personnel. Because the script includes information about the cameras for each scene, the cameras can to automated to move (e.g., via a programmed dolly and a crane) and/or rotated according to the script. Minimal user intervention is thus needed to obtain each shot.

EDMS—End Devices Management System

The EDMS is a proxy server which receives instructions from MPDS and relay the instructions to all end devices and personnel during the film shooting. Since EDMS controls end devices in real time, the proximity between the EDMS server(s) and the scene locations can reduce or eliminate unnecessary network delays to enable real-time performance.

In some implementations, the EDMS can be used to provide some or all of the following services to manage end devices and personnel:

1. Device registration. Once a device is turned on, it communicates with the closest EDMS server for authentication. Only devices registered by user are allowed to connect to the servers.

2. Device control. The EDMS obtains information about the devices and personnel based on machine-readable scripts generated by MPUS. For each particular shot, the EDMS sends instructions to end devices and personnel for actions these devices and people can take. For example, the EDMS can prompt the personnel about the lines of the shot or control the movement and/or rotation of the camera.

3. Device synchronization. It is vital to synchronize all devices to the exact time in the production stage for accurate editing in the post-production stage. Typically, an accuracy within a video frame (25/30 frame/second) is required for accurate film cutting. In some implementations, the Network Timing Protocol (NTP) can be used for the synchronization purposes. For example, a synchronization server (e.g., an NTP server) can be included in the MPaaS system to synchronize the end devices with the CFES. Time stamps of Real-time Transport Protocol (RTP) stream in real time streaming or time stamps of multimedia containers in non-real-time batch transport are used for accurate film editing.

4. Location service of the device. When an end device enables the location service, the EDMS can obtain the current location of the end device. The EDMS can then control the movement of the device from one scene location to another. Information can be transmitted to the MPDS to further determine the movement of the device.

5. Device tracking. The EDMS collects device activities and tracks the timestamps for all the activities. It can report the activities and associated timestamps to the MPDS to facilitate operations in the later production stage. As described above, the MPDS updates the time estimate for subsequent scenes in the machine-readable script for more accurate time estimation based on the time stamps from EDMS.

6. Encoding support. The EMDS also controls the end devices media encoding. Video codec, such as the popular H.264 and MPEG4, use various types of frames such as Intra-coded frame (I-frame), Predicated frame (P-frame), and Bidirectional predicted frame (B-frame). Film editing can only start at an I-frames. Frequency of film cutting is highly dependent on type of scenes. For example, action scenes typically have highest frequency of cut. Network bandwidth also needs to be taken into account for real-time broadcasting of the content as higher I-frame rate increases uplink network demand. Therefore, the MPDS decides the number of I-frames required within a specified time period to ensure proper editing of the film. The EDMS can configure encoding setting on the end devices based on MPDS instructions (e.g., as included in the machine-readable script).

Cloud-Based Film Editing System (CFES)

The CFES carries out most of post-production activities in an automated way. CFES has to be synchronized with end devices such as cameras and audio recording devices. It can either operate on all multimedia contents after the film shooting is completed or operate in real-time on multimedia contents streamed from end devices while content being captured at the scene. The CFES also allows the editing to be performed in a manual fashion if the user decides to add additional edits for artistic considerations. In various implementations, the CFES can be designed to provide four main functions: film editing, audio editing, multimedia quality enhancement and commercial insertion. Each of the functions is discussed in detail below.

Film Editing

Film editing is deemed to be a highly creative and artistic process and is usually performed by a human editor. However, in some movie productions, this editing process, either in part or in its entirety, can be computerized by using digital analytics and software. For example, some low-budget films typically do not require sophisticated editing techniques. As another example, real time movie broadcasting cannot afford long delays caused by manual editing. The CFES is thus suitable to be used in such cases to perform film editing automatically. As techniques in media processing advance, the CFES can also employ advanced algorithms to achieve artistic editing.

In some embodiments, the CFES can perform a basic editing of the shot. As an example, a shot includes a conversation among several actors. The shot is recorded by multiple corresponding cameras, such as shown in Table 1. Given the footages from multiple cameras, the CFES can detect the actor who is currently speaking and select the corresponding footage with the camera facing the actor. More artistic film cutting techniques (e.g., Montage) can be realized in various ways. In some implementations, a footage that resonates human feelings can be selected by the system based on artificial intelligence learning. In some implementations, the CFES edits the shot based on the instructions in the FDML movie script. As discussed above, the instructions can be inserted by the user or generated automatically by the system based on the storyline. For example, the machine-readable script can define that while the person A is making a dramatic statement, person B's facial expression changes. Therefore, the cut has to be made in the middle of the sentence spoken by person A.

The CFES can further receive instructions from the MPDS to perform editing. For example, the MPDS can insert timestamp information into the machine-readable scripts once the shot is completed. Based on the timestamps, the CFES can determine when and how the footage needs to be cut to connect multiple scenes. For real-time or pseudo-real-time productions, the CFES can use the constraints described in the machine-readable scripts and add content when there is a dependency between the scenes. For example, both scene A and scene B require the same equipment and personnel. Transferring the equipment and personal from location A (for scene A) to location B (for scene B) requires a time gap of T. The CFES can intelligently determine, in part based on instructions from the MPDS, what content (e.g., commercial clip, background story, another scene, etc.) can be added to fill in the gap T and perform editing accordingly.

Audio Editing

Audio editing is less complex as compared to video editing because, for low-budget movies, there may be only one audio stream at each location. In some cases, a conversation involving multiple actors can happen in different locations (e.g., a phone conversation). The CFES can be designed to determine, in part based on machine-readable scene scripts, that it needs to piece the audio streams together. The timestamp information in the machine-readable scripts can be used to synchronize the audio streams and allow the CFES to perform audio editing accordingly.

Multimedia Quality Enhancement

Multi-media quality enhancement is unique to real-time movie production/broadcasting. As compared to traditional movie production, which records High-Definition (HD) video and audio on devices, real-time movie production/broadcasting requires instant distribution over the network after completion of the production. Transmitting HD videos imposes an extreme bandwidth requirement on the network, which is not always feasible in many settings. Thus, it is desirable to compress the video data and perform quality enhancement to the compressed data before distribution.

On-Line Movie Distribution

Referring back to FIG. 2, the movie production system 200 include a Content Delivery System (CDS) 211 to provide real-time or quasi-real-time distribution of the content to directly to consumers (e.g., on a payment basis or on a subscription basis) or to on-line movie and TV programming service providers (e.g., Netflix) which use their service platforms to deliver the movies to their customers. The CDS 211 may be an interface to allow authorized access by others in some implementations and may include one or more servers to form a content delivery network. The content to be distributed via the CDS 211 can be stored in in the digital storage in the main sub-systems for storing digital data for the movie production and/or in the additional storage 209.

In implementing the system 200, a multimedia digital content such as a movie or TV show can be made, edited and delivered by operating one or more computers in communication with one or more communication networks configured to receive information about a storyline, cameras, cast, and other assets for the multimedia digital content from a user, to provide control commands to cameras in capturing video and sound of acts performed based on the storyline, and to edit the captured video to produce the multimedia digital content. In some applications, the CDS 211 can be configured to distribute the multimedia digital content over a network shortly after the multimedia digital content is produced. In other applications, the CDS 211 can be configured to begin distribution of the beginning portion of the multimedia digital content over a network while a later portion of the multimedia digital content is still being produced. This mode of content delivery may be used in delivering TV shows or other contents where timely delivery is highly desirable or beneficial, and is possible due to automated features and functions that are built into the system 200.

The CDS 211 may be designed to allow for distribution of the same movie or TV show with certain customized features that are uniquely provided based on the recipients of the content to be delivered. One example of this feature is the capability of the system 200 to provide different product placements for the same TV show or movie when being delivered to different audience groups.

Commercial Insertion

Commercials or products can be incorporated into or embedded in a movie, a TV show or a vide in various ways to provide embedded marketing. One commonly used technique is product placements where brand-name products can be shown in the shots or included in the audio tracks. Various existing product placement techniques via images or audio lack flexibility, tend to be expensive and usually do not provide much flexible means for alternating the product placement after the production. CFES 207 in FIG. 2 can be used to implement commercial insertion or product placement in ways that are much more flexible than various product placement techniques in movie or TV production. In some traditional movie production, for example, commercials, such as billboards or brand names, cannot be changed easily after the shot is completed. With the CFES system 207, the machine-readable script can include placeholders for commercials. Referring to the example shown in Table 1, Scene ID 2 includes two commercials. The CFES 207 can determine how the shot needs to be edited to include the relevant products. For example, the movie can be shot without any commercial content in the production stage. In the post-production stage, the CFES 207 can edit the original footage (e.g., Jenny's wrist) to include the desired commercial content (e.g., a watch) based on a particular distribution such as marketing to a specific demographic group.

Modifications of the commercial suppliers can be implemented with easy with the use of the FDML scripts. Based on the descriptions of the commercial placeholders in the FDML scripts, the CFES locates the shots and replaces the original image or audio with designated commercial content (e.g., switching the cylindrical drink from Coco-cola to Pepsi). The CFES can further detect dependencies among the shots to ensure that the commercials can be incorporated consistently across multiple shots and/or scenes. For example, the CFES can detect Jenny's wrist in all shots of Scene ID 2 and add the watch to all footages that show Jenny's wrist.

Besides the three main functions discussed above, the CFES can also perform other editing functions such as adding background videos to blue screen, adding text, adding music based on MPDS instructions.

Figure 5:
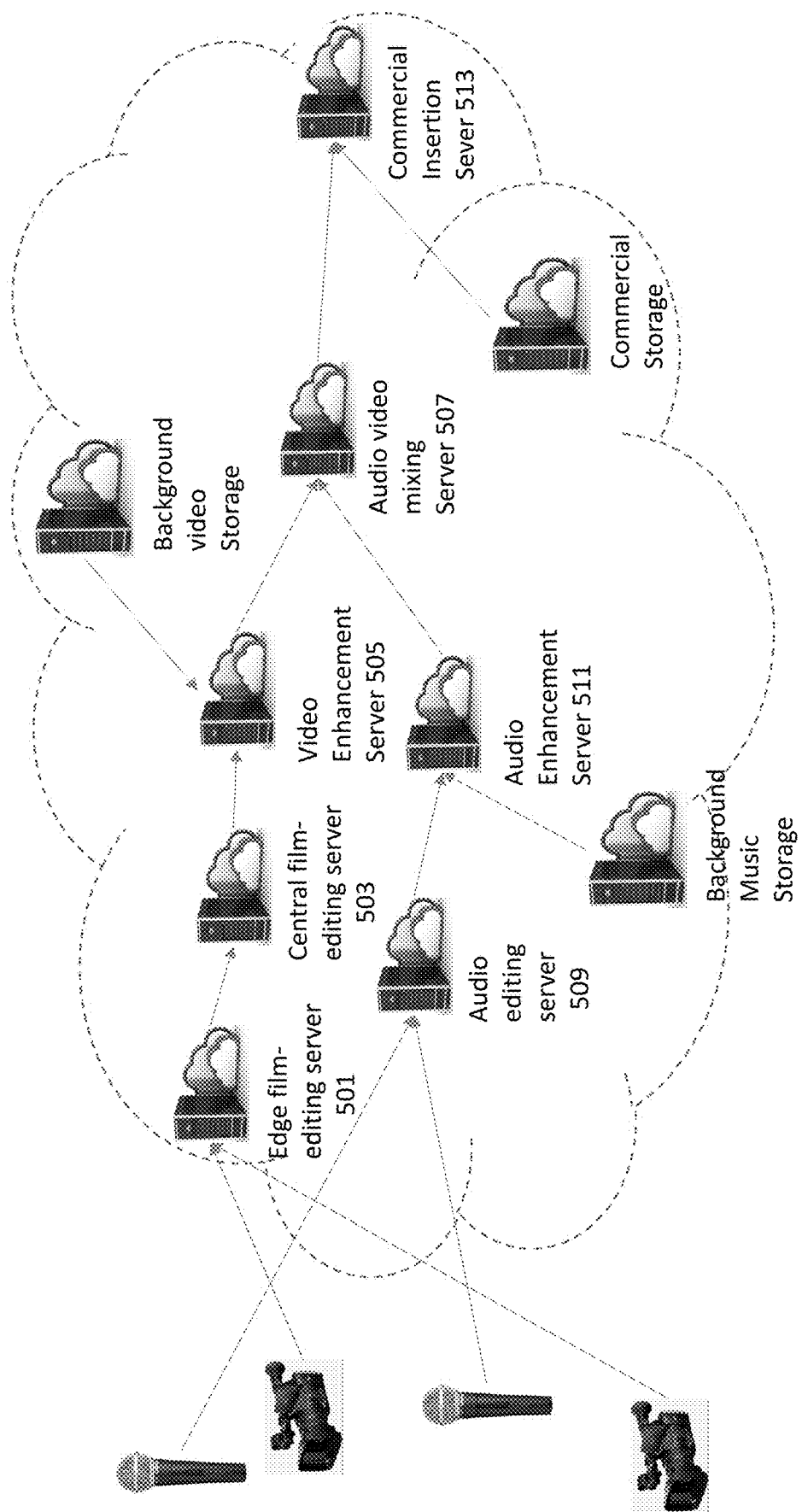
FIG. 5 illustrates an example distributed architecture of Cloud-Based Film Editing System (CFES) in accordance with the present technology.

FIG. 5 illustrates an example distributed architecture 500 of CFES in accordance with the present technology. In this architecture 500, some of the film-editing functions can be performed by one or more edge film-editing servers 501. For example, scenes shot in a particular location can be edited by a corresponding edge film-editing server positioned close to the location. The proximity between the edge editing server 501 and the scene location allows preliminary editing to be completed without much network delay. The edge CFES servers are especially important if the movie is being broadcasted in near real time or shortly after completion of the final movie editing. For non-real time post production editing, such edge CFES servers might not be necessary since all recorded multimedia contents will be gathered to a single cloud location for processing. The edited footages from the edge film-editing serves can be consolidated by the central film-editing server 503 for further processing (e.g., editing across scenes in multiple locations). The fully edited footage is then sent to the video enhancement server 505 for performing compression and other enhancements before being mixed with edited audio stream from the audio editing server 509 and the audio enhancement server 511. Once the enhancements are completed, the commercial insertion server 513 replaces selected portion of the footage with desired commercial content. The commercial insertion server 513 can also take footages with existing commercial content and replace them with another brand.

It is noted that each block in FIG. 5 represents a logic functional entity instead of a physical entity. Logical entities can be combined into one physical entity or separated into different entities based on cost, technological, networking and scale considerations. The data flow from one physical entity to another can be streaming for real time processing and or can be batch transport for offline processing.

Figure 6:
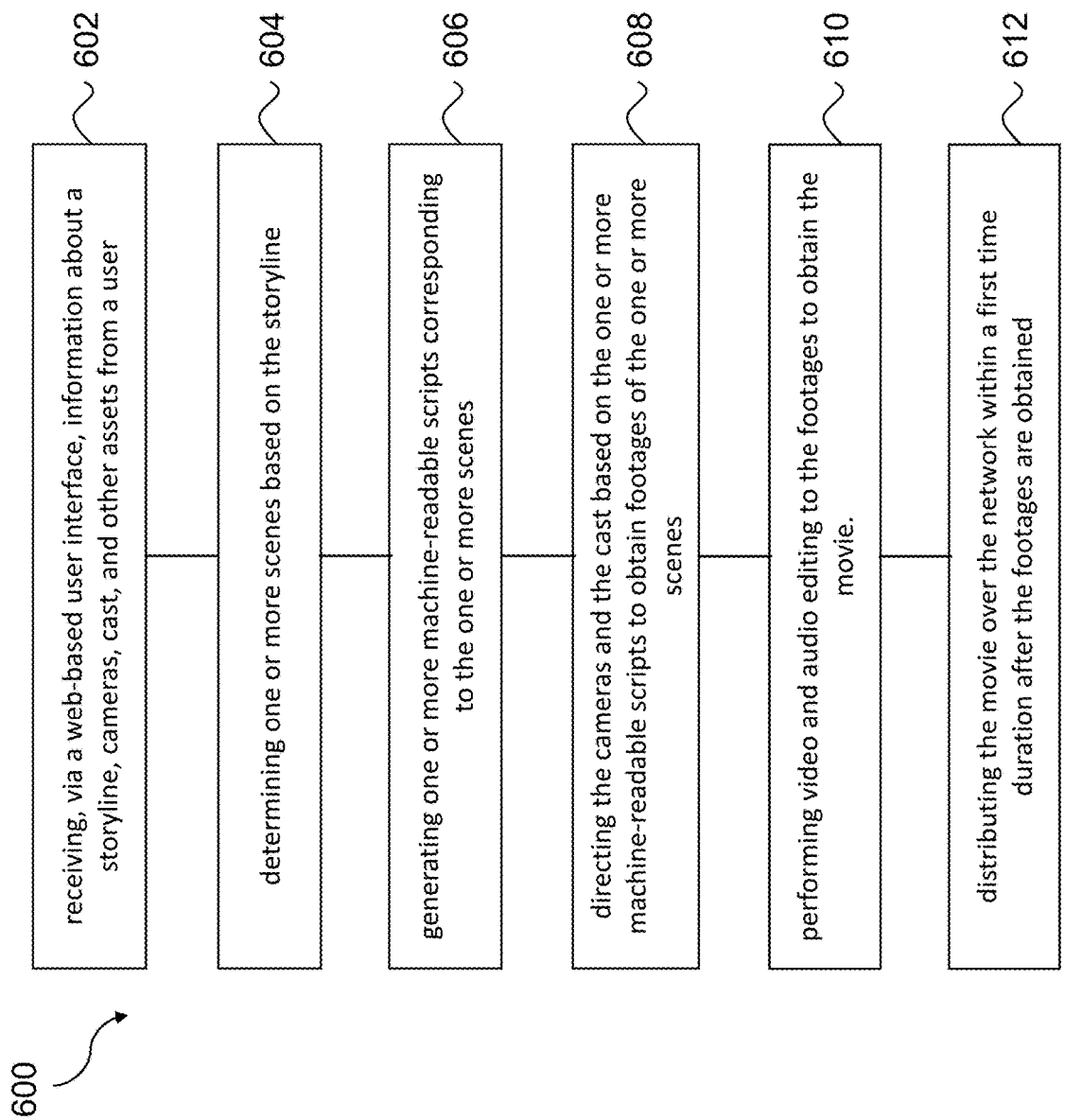
FIG. 6 is a flowchart representation of a method for producing a movie in accordance with the present technology.

FIG. 6 is a flowchart representation of an example of a method 600 for producing a movie. The method 600 includes, at operation 602, receiving, via a web-based user interface, information about a storyline, cameras, microphones, cast, and other assets from a user. The method 600 includes, at operation 604, determining one or more scenes based on the storyline. The method 600 includes, at operation 606, generating one or more machine-readable scripts corresponding to the one or more scenes. Each machine-readable script includes information about corresponding cameras, cast, and asset of the corresponding scene. The method 600 includes, at operation 608, directing the cameras and the cast based on the one or more machine-readable scripts to obtain footages of the one or more scenes. The method 600 includes, at operation 610, performing video and audio editing to the footages to obtain the movie. The method 600 also includes, at operation 612, distributing the movie over the network within a desired time duration (e.g., 30 minutes) after the footages are obtained.

Figure 7:
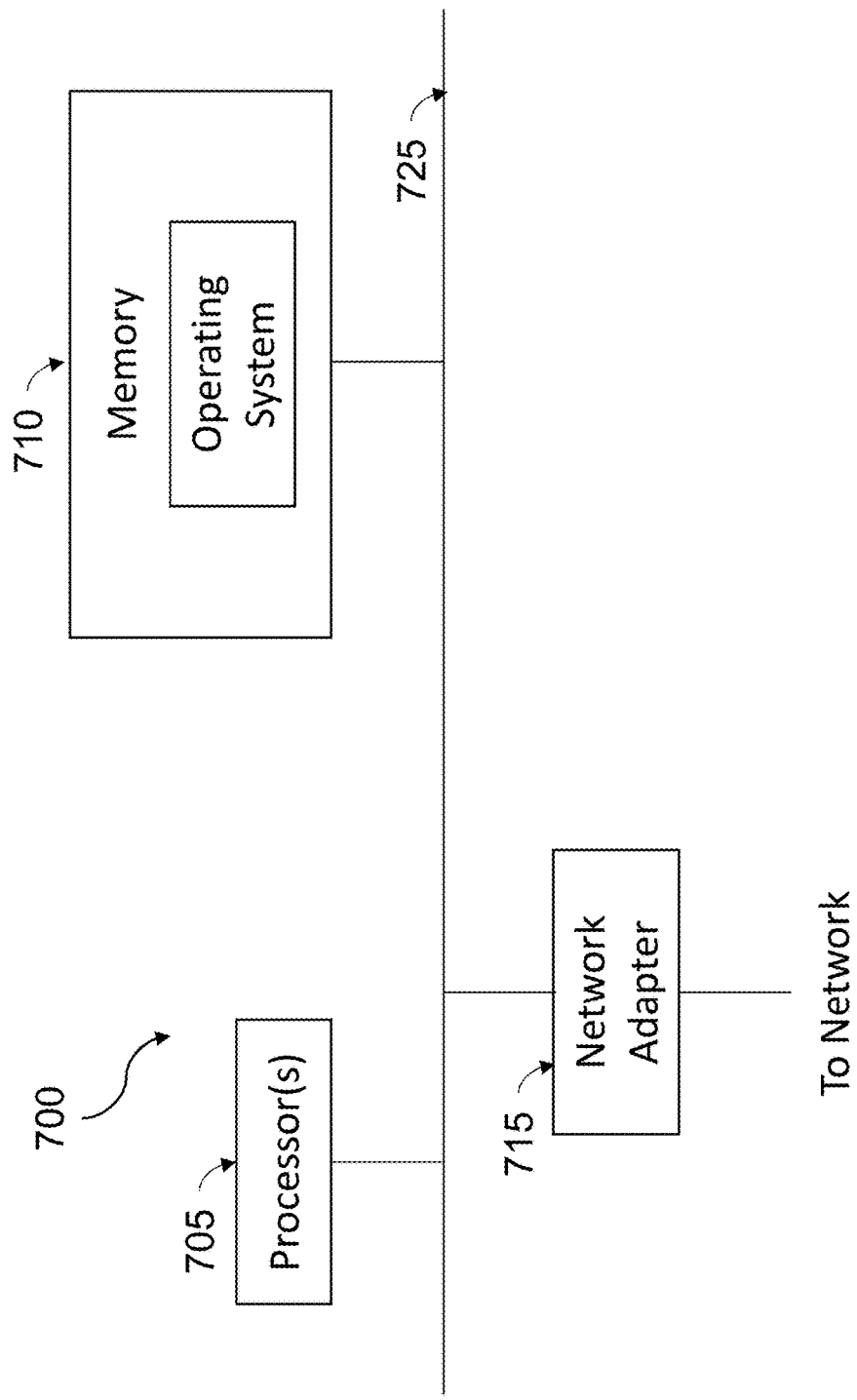
FIG. 7 a block diagram illustrating an example of the architecture for a computer system or other control device that can be utilized to implement various portions of the presently disclosed technology.

FIG. 7 is a block diagram illustrating an example of the architecture for a computer system or other control device 700 that can be utilized to implement various portions of the presently disclosed technology. The computer system 700 includes one or more processors 705 and memory 710 connected via an interconnect 725. The interconnect 725 may represent any one or more separate physical buses, point to point connections, or both, connected by appropriate bridges, adapters, or controllers. The interconnect 725, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 705 may include central processing units (CPUs) to control the overall operation of, for example, the host computer. In certain embodiments, the processor(s) 705 accomplish this by executing software or firmware stored in memory 710. The processor(s) 705 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 710 can be or include the main memory of the computer system. The memory 710 represents any suitable form of random access memory (RAM), read-only memory (ROM), flash memory, or the like, or a combination of such devices. In use, the memory 710 may contain, among other things, a set of machine instructions which, when executed by processor 705, causes the processor 705 to perform operations to implement embodiments of the presently disclosed technology.

Also connected to the processor(s) 705 through the interconnect 725 is a (optional) network adapter 715. The network adapter 715 provides the computer system 700 with the ability to communicate with remote devices, such as the storage clients, and/or other storage servers, and may be, for example, an Ethernet adapter or Fiber Channel adapter.

It is thus evident that, with the assistance from the cloud-based movie production systems and techniques as disclosed herein, movies, TV shows or videos can be produced at a much lower cost and at a much higher speed. The repetitive and time-consuming planning can be replaced by automation and modifications specific to each storyline. The distributed architecture allows post-production editing to be performed close to the shooting scenes such that the movie can be distributed shortly after it is completed (e.g., within 30 minutes to an hour after camera shooting finishes). The short post-production time can greatly reduce the risks of content leaks, thereby protecting the artistic work and financial interest of the entire production crew. The disclosed cloud-based movie production systems and techniques can also be improved by leveraging the increasing communication speeds and bandwidths in communication networks such as 5G and future networks.

The above examples demonstrate that the techniques and systems disclosed in this patent document for production of movies, TV shows and other multimedia based on cloud computing and on-line accessing can be used to enhance the existing productions by movie and TV production companies, to reduce labor and costs, to provide flexibility and features that are not available in various convention movie or TV production processes. In addition, the disclosed techniques and systems can be used to simplify the production processes and thus enable amateur production of movies and videos. Instead of costing at least half million dollars for lowest cost movie production, movies can be made with a few thousand dollars (or even a few hundred dollars) using the disclosed techniques. The low cost can incentivize a large group of artists to produce intriguing content, which can potentially lead to a hundred-billion-dollar industry. The techniques and systems disclosed in this patent document can be implemented to enable Movie Production As A Service (MPaaS) to allow movie production technologies to be better utilized by professional production companies and to also allow such technologies assessible to more users in the mass market.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, machine-readable script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is what is described or illustrated, including:

1. A system for producing a multimedia digital content including a movie, comprising:
    a pre-production subsystem configured to receive information about a storyline, cameras, cast, and other assets for the movie from a user, the pre-production subsystem configured to determine one or more scenes based on the storyline and generate one or more machine-readable scripts corresponding to the one or more scenes;
    a production subsystem configured to receive the one or more machine-readable scripts from the pre-production subsystem to determine constraints among the one or more scenes, the production subsystem further configured to (1) determine actions for the cameras, the cast, or the other assets and (2) editing instructions for each of the one or more scenes for a production of footages according to the storyline;
    a device management subsystem in communication with the production subsystem and configured to control the cameras, the cast, or the other assets based on the determined actions by the production system, the device management subsystem comprising one or more device management servers each located in proximity with a corresponding scene, wherein each of the one or more device management servers is configured to (1) track activities associated with the corresponding scene and (2) transmit information about the activities to the production subsystem to enable the production subsystem to adjust the one or more machine-readable scripts to update, in real-time during the production, the editing instructions and the actions for the cameras, the cast, or the other assets for each of the one or more scenes;
    a post-production editing system configured to (1) receive a part of the footages from the production subsystem while a remaining part of the footages is being produced and (2) perform video and audio editing in real-time according to the adjusted one or more machine-readable scripts, the post-production editing system comprising one or more edge editing servers each located in proximity to a corresponding scene to edit footages associated with the corresponding scene based on the editing instructions in the one or more machine-readable scripts and a central editing server configured to consolidate edited footages from the one or more edge editing servers to produce the movie; and
    a content delivery system configured to distribute a portion of the movie over one or more communication while a remaining portion of the movie is being edited by the post-production editing system.

2. The system of claim 1, wherein the pre-production subsystem comprises a web-based user interface for receiving the information from the user.

3. The system of claim 1, wherein the pre-production subsystem is configured determine a genre of the movie based on the storyline and provide one or more templates for pre-production planning.

4. The system of claim 1, wherein the pre-production subsystem is configured to generate a production schedule based on the constraints among the one or more scenes determined by the production subsystem.

5. The system of claim 1, wherein the production subsystem is configured to analyze cameras, cast, and assets for each scene to determine the constraints among the one or more scenes.

6. The system of claim 1, wherein each scene includes one or more shots, each shot being a continuous shooting period in a one location, and wherein each of the one or more machine-readable scripts includes a start time and a duration for each shot.

7. The system of claim 6, wherein the production subsystem is configured to adjust the start time and the duration of a shot during the production of the footages and update the start time and the duration of subsequent shots.

8. The system of claim 1, further comprising a synchronization server configured synchronized the cameras with the post-production editing system.

9. The system of claim 1, wherein the content delivery system is configured to distribute the movie over the one or more communication channels within a first time duration after the footages are completed by the production subsystem.

10. The system of claim 9, wherein the first time duration is in a range of 30 minutes to an hour.

11. The system of claim 1, wherein the one or more machine-readable scripts comprise information about commercial content of a product in at least one of the one or more scenes, and wherein the post-production editing system is further configured to perform video and audio editing to include the commercial content of the product in the part of footages corresponding to the scene.

12. A method for producing a movie, comprising:
    receiving, via a web-based user interface, information about a storyline, cameras, cast, and other assets for the movie from a user;
    determining one or more scenes based on the storyline;

generating one or more machine-readable scripts corresponding to the one or more scenes, the one or more machine-readable scripts including information about corresponding cameras, cast, assets, and editing instructions of a corresponding scene;

directing the cameras, the cast, or the other assets based on the one or more machine-readable scripts to obtain footages according to the storyline, wherein the directing comprises:
    tracking activities associated with each of the one or more scenes during shooting of the footages, and
    adjusting the one or more machine-readable scripts to update the editing instructions and actions for the cameras, the cast, or the other assets for each of the one or more scenes;

performing video and audio editing to a part of the obtained footages according to the editing instructions in the one or more machine-readable scripts to obtain the movie while a remaining part of the footages is being shot; and distributing a portion of the movie over a network in real time while a remaining portion of the movie is being edited.

13. The method of claim 12, comprising:
determining a genre of the movie based on the storyline; and
generating one or more templates using the genre.

14. The method of claim 12, comprising:
analyzing cameras, cast, and assets for each of the one or more scenes; and
determining constraints among the one or more scenes based on information in the one or more machine-readable scripts.

15. The method of claim 12, wherein each script includes a start time and a duration of a shot in each scene, and the adjusting the one or more machine-readable scripts further comprises:
adjusting the start time and the duration of the shot during shooting, and
adjusting the start time and the duration of a subsequent shot of the movie.

16. The method of claim 15, comprising:
generating a production schedule based on the constraints among the one or more scenes.

17. The method of claim 16, comprising:
determining an impact on the production schedule based on the adjusted durations of shots; and
providing a prompt to the user to indicate the impact.

18. The method of claim 15, wherein the footages are synchronized in part based on the start time and the duration in each of the one or more machine-readable scripts.

19. The method of claim 12, wherein the portion of the movie is distributed over the network within a first time duration after the footages are obtained, and wherein the first time duration is in a range of 30 minutes to an hour.

20. The method of claim 12, wherein the one or more machine-readable scripts comprise information about commercial content of a product in at least one of the one or more scenes, and wherein the performing video and audio editing comprises:
editing the part of the footages to include the commercial content of the product.

21. A non-transitory computer readable medium having processor code stored thereon including program code for performing a method that comprises:

receiving, via a web-based user interface, information about a storyline, cameras, cast, and other assets for the movie from a user;

determining one or more scenes based on the storyline;

generating one or more machine-readable scripts corresponding to the one or more scenes, the script including information about corresponding cameras, cast, assets, and editing instructions of a corresponding scene;

directing the cameras, the cast, or the other assets based on the one or more machine-readable scripts to obtain footages according to the storyline, wherein the directing comprises:
    tracking activities associated with each of the one or more scenes during shooting of the footages, and
    adjusting the one or more machine-readable scripts to update actions for the cameras, the cast, or the other assets and the editing instructions for each of the one or more scenes;

performing video and audio editing to a part of the obtained footages according to the editing instructions in the one or more machine-readable scripts to obtain the movie while a remaining part of the footages is being shot; and distributing a portion of the movie over a network in real time while a remaining portion of the movie is being edited.

22. The non-transitory computer readable medium of claim 21, wherein the method comprises:
determining a genre of the movie based on the storyline; and
generating one or more templates using the genre.

23. The non-transitory computer readable medium of claim 21, wherein the method comprises:
analyzing cameras, cast, and assets for each of the one or more scenes; and
determining constraints among the one or more scenes based on information in the one or more machine-readable scripts.

24. The non-transitory computer readable medium of claim 21, wherein each script includes a start time and a duration of a shot in each scene, and the adjusting the one or more machine-readable scripts further comprises:
adjusting the start time and the duration of the shot during shooting, and
adjusting the start time and the duration of a subsequent shot of the movie.

25. The non-transitory computer readable medium of claim 24, wherein the method comprises:
generating a production schedule based on the constraints among the one or more scenes.

26. The non-transitory computer readable medium of claim 25, wherein the method comprises:
determining an impact on the production schedule based on the adjusted durations of shots; and
providing a prompt to the user to indicate the impact.

27. The non-transitory computer readable medium of claim 24, wherein the footages are synchronized in part based on the start time and the duration in each of the one or more machine-readable scripts.

28. The non-transitory computer readable medium of claim 21, wherein the portion of the movie is distributed over the network within a first time duration after the footages are obtained, and wherein the first time duration is in a range of 30 minutes to an hour.

29. The non-transitory computer readable medium of claim 21, wherein the one or more machine-readable scripts comprise information about commercial content of a product in at least one of the one or more scenes, and wherein the performing video and audio editing comprises:
 editing the part of the footages to include the commercial content of the product.

* * * * *